United States Patent
Dobrowolski

[15] 3,698,515
[45] Oct. 17, 1972

[54] VACUUM PUMP LUBRICATION SYSTEM

[72] Inventor: Zbigniew C. Dobrowolski, Needham, Mass.

[73] Assignee: General Signal Corporation

[22] Filed: Dec. 21, 1970

[21] Appl. No.: 100,260

[52] U.S. Cl. .................184/6.23, 55/218, 55/432, 55/466, 55/473
[51] Int. Cl. .............................................F16n 39/00
[58] Field of Search........55/210, 218 X, 428, 432 X, 55/466 X, 467, 468, 473 X; 184/6.16, 6.23, 65, 84, 86

[56] References Cited

UNITED STATES PATENTS

| | | | |
|---|---|---|---|
| 500,451 | 6/1893 | White | 184/84 X |
| 781,553 | 1/1905 | Ritter | 184/86 X |
| 2,983,435 | 5/1961 | Burnell | 184/6.16 X |
| 2,391,000 | 12/1945 | Allen | 184/6.16 X |
| 2,453,602 | 11/1948 | Strickler, Jr. et al | 184/6.23 X |
| 2,689,080 | 9/1954 | Preis | 184/6.16 X |
| 2,675,958 | 4/1954 | Deibel | 184/6.16 X |

Primary Examiner—Manuel A. Antonakas
Attorney—Dodge & Ostmann

[57] ABSTRACT

An oil-sealed, mechanical vacuum pump is provided with a scheme for reducing re-entrainment of oil in the gas stream passing through the oil separator of the pump. The scheme comprises check valve means located in the gravity feed lubrication circuit leading from the separator to the pump bearings and which serves to prevent reverse flow of gas into the separator during operation of the pump at high inlet pressures. This measure prevents agitation of the stored oil in the separator, and consequently reduces the risk of re-entrainment resulting from splashing.

1 Claim, 2 Drawing Figures

PATENTED OCT 17 1972 3,698,515

INVENTOR
ZBIGNIEW C. DOBROWOLSKI

BY Dodge & Ostmann
ATTORNEYS

VACUUM PUMP LUBRICATION SYSTEM

BACKGROUND AND SUMMARY OF THE INVENTION

The discharge steam of an oil sealed, mechanical vacuum pump contains both gas and oil, so it is passed through an oil separator and a mist filter before being expelled to the atmosphere. The entrained oil extracted from the gas is stored in the separator until it is returned to the working space of the pump through the bearing lubrication circuit. This circuit commonly is of the gravity feed type, i.e., oil is fed to the pump solely by a small liquid head and the differential between the atmospheric pressure in the separator and the pressure in the working space inside the pump. The design of the separator has received much attention lately in connection with efforts to increase separation efficiency without increasing the size of the separator. application, Ser. No. 99,988, filed Dec. 21, 1970, discloses one fruit of this work. However, even in the case of this superior unit, the gas stream leaving the separator may still contain substantial amounts of oil when the pump is operating at inlet pressures between about 450 and 760 Torr. The object, therefore, of the present invention, is to find a way of reducing the quantity of oil entrained in the gas stream leaving a separator which is already relatively efficient from the standpoint of removing oil from the entering gas stream.

Investigation of the oil-entrainment problem revealed that, in the case of pumps having gravity lubrication systems, oil flow into the pump ceases as inlet pressure rises above about 450 Torr, and compressed gas is delivered to the separator through the lubrication lines. It has been found that this gas, which enters the separator at a point below the liquid level, agitates the stored oil, thereby causing it to become re-entrained in the gas stream or to splash onto the separator walls and creep into the exhaust port. These effects, of course, nullify to some extent the good performance of the oil-separating mechanism. In light of this discovery, the invention solves the stated problem by incorporating in the gravity lubrication system check valve means oriented to block reverse flow into the separator. This measure precludes agitation of the stored oil by gas escaping into the lubrication lines, and thus eliminates oil losses attributable to such agitation. As a result, the invention allows realization of the full benefits of a well designed separator.

BRIEF DESCRIPTION OF THE DRAWING

The preferred embodiment of the invention is described herein with reference to the accompanying drawing in which.

DESCRIPTION OF PREFERRED EMBODIMENT

Figure 1:
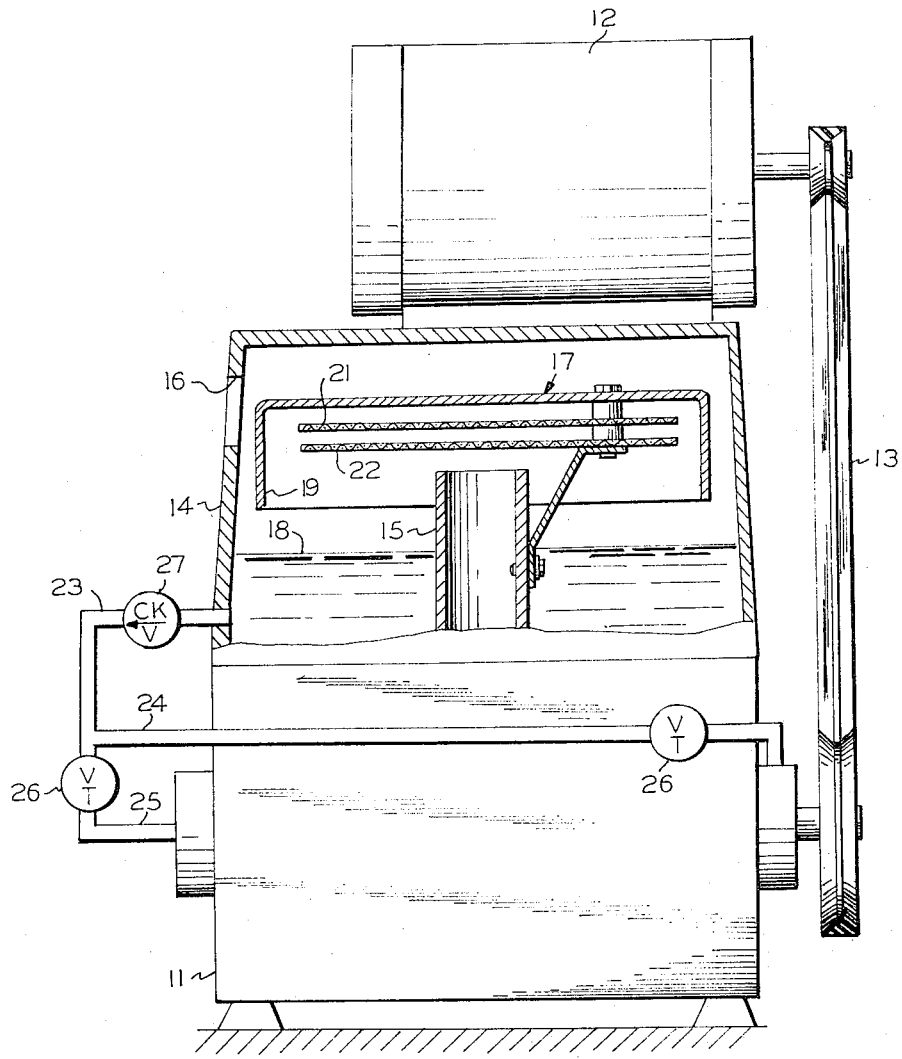
FIG. 1 is a schematic diagram of the improved vacuum pump.

As shown in FIG. 1, the invention is associated with a mechanical vacuum pump 11, such as one of the KT series of Triplex Vacuum Pumps marketed by Kinney Vacuum Company. Pump 11 is driven by an electric motor 12 through belt and pulley drive train 13, and it is equipped with an oil separator 14 into which opens its discharge pipe 15. The separator is provided with an exhaust port 16 through which the pumped gases are delivered to a mist filter (not shown) and then to the atmosphere, and contains an umbrella baffle unit 17 mounted on pipe 15 above the surface 18 of the pool of stored oil. The baffle unit is of the type described in application, Ser. No. 99,988, mentioned above, and includes a cup-shaped baffle having a vertical skirt 19, and a pair of spaced wire mesh screens 21 and 22 which are arranged to intercept the gas-oil mixture discharging from pipe 15. At times when the inlet pressure of the pump is raised suddenly while the pump is operating in the low pressure range, oil is displaced from the interior of the pump and enters separator 14 as a slug. Screens 21 and 22 serve to disperse such slugs and prevent them from disrupting the surface 18 of the oil pool. On the other hand, under steady state, high pressure conditions, i.e., when the mass rate of flow of gas is high, the screens serve to coalesce atomized oil into particles large enough to separate by gravity from the gas steam.

Figure 2:
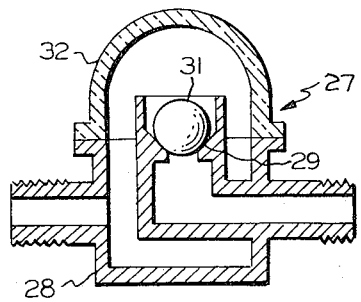
FIG. 2 is a sectional view of the preferred type of check valve employed by the invention.

Pump 11 is equipped with a gravity lubrication system including a common line 23 which opens into separator 14 at a point below the lowest elevation of oil level 18, and a pair of branch lines 24 and 25 which lead to the bearings (not shown) at opposite ends of the pump. Each of the branch lines is provided with a throttling valve 26 which permits adjustment of the oil feed rate. The bearing clearances communicate with the pumping space or spaces within pump 11, so, at inlet pressures above about 450 Torr, there is a tendency for compressed gas to flow to separator 14 through the lines of the lubrication system. In accordance with the teachings of this invention, this gas flow is prevented by a check valve 27 interposed in common line 23 and oriented as shown in FIG. 1. The pressure head available for lubrication purposes is relatively small, and, therefore, check valve 27 should be loaded only lightly in the closing direction. The preferred design is shown in FIG. 2 and includes a brass body 28 provided with a conical seat 29, a ball element 31 made of high temperature Nylon or Teflon, and a glass dome 32. Since unseating of ball 31 can be observed visually through dome 32, this version of check valve 27 performs the added function of an oil flow indicator.

I claim:

1. In an oil-sealed, mechanical vacuum pump (11) including a discharge pipe (15) leading from a working space to an elevated separator (14) wherein oil is separated from pumped gas and stored, and a gravity feed lubrication system (23-26) serving to load stored oil from the separator (14) to the working space through a bearing of the pump, the improvement which comprises check valve means (27) located in said lubrication system and arranged to permit flow from, but not into, the separator.

* * * * *